United States Patent [19]
Melin et al.

[11] 3,863,549
[45] Feb. 4, 1975

[54] GRIPPER-TRANSFER DEVICE FOR PLASTIC BAGS

[75] Inventors: Martin James Melin, Palos Hills, Ill.; Rodney Lee Wallace, Centerville, Iowa

[73] Assignee: Union Carbide Corporation, New York, N.Y.

[22] Filed: Apr. 23, 1973

[21] Appl. No.: 353,916

[52] U.S. Cl. ............... 93/35 R, 93/13, 93/33 H, 93/93 HT, 198/180, 271/204
[51] Int. Cl. ............................................ B31b 23/26
[58] Field of Search ............... 271/204, 205, 206; 198/180; 93/13, 93 HT, 93 R, 8 R, 35 R, 14, 18, 21, 26, 33 H, 93 DP

[56] References Cited
UNITED STATES PATENTS

| | | | |
|---|---|---|---|
| 1,672,935 | 6/1928 | Goodwin | 271/206 X |
| 2,731,891 | 1/1956 | Weisshuhn et al. | 93/13 |
| 3,549,145 | 12/1970 | Trautmann | 93/93 DP |
| 3,631,770 | 1/1972 | Kratzert et al. | 93/93 DP |
| 3,687,447 | 8/1972 | Mundus | 198/180 X |

*Primary Examiner*—Granville Y. Custer, Jr.
*Assistant Examiner*—James F. Coan
*Attorney, Agent, or Firm*—Maurice W. Ryan

[57] ABSTRACT

A conveyor mounted bag gripper coacts with a bag foldover forming blade to fold over a flexible plastic film bag just formed at a bag bottom sealing-cutting station in a bag manufacturing operation, closes to grip and hold the folded over bag, strips the folded over bag from the forming blade as it travels with the conveyor to a bag stacking station, and then opens to release the bag at the bag stacking station.

4 Claims, 6 Drawing Figures

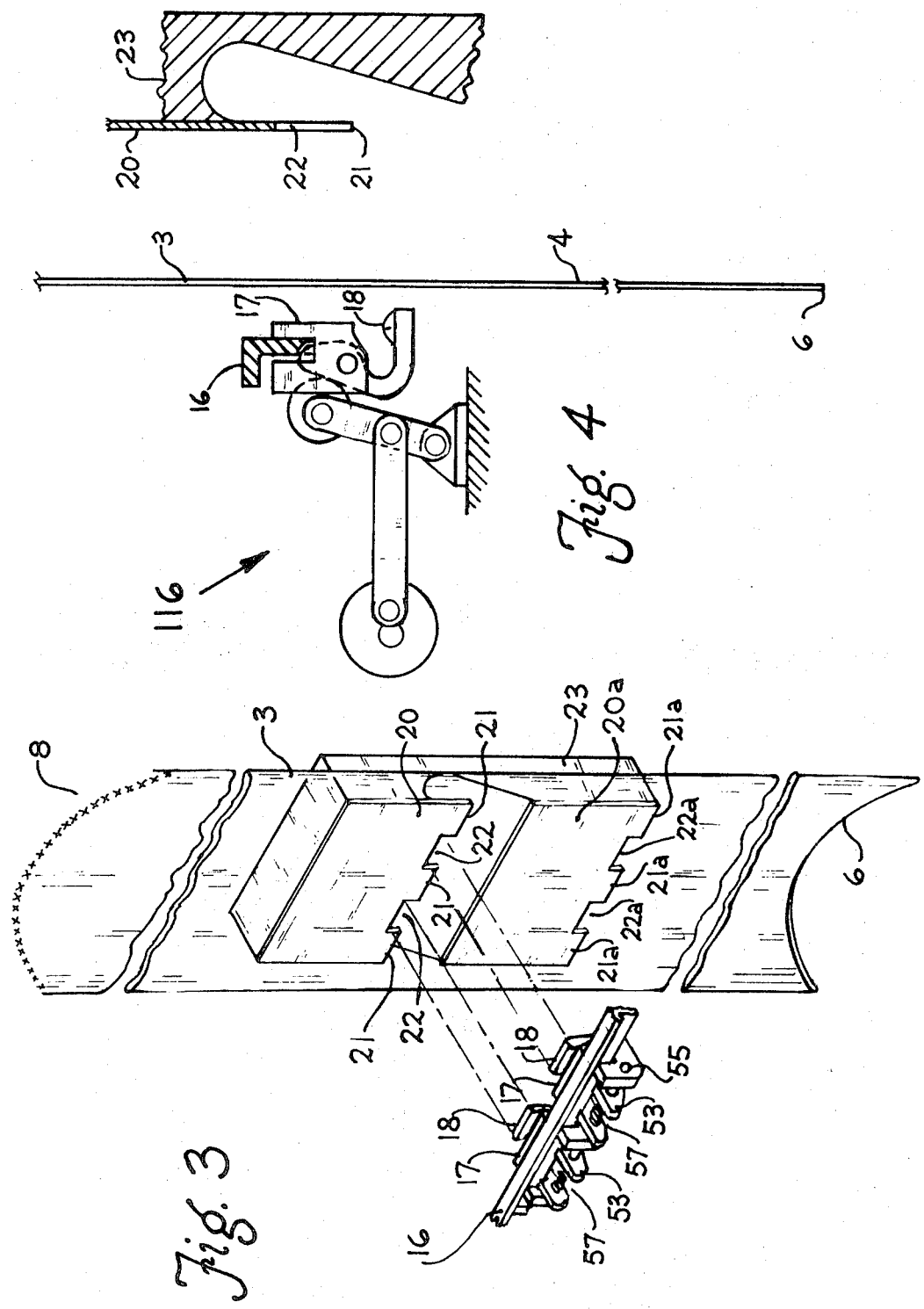

3,863,549

GRIPPER-TRANSFER DEVICE FOR PLASTIC BAGS

The present invention relates to a bag handling apparatus and method used in the manufacture of flexible plastic film bags formed by continually sealing a bottom and cutting across a continuous supply of flattened tubular plastic film to form each bag, and more particularly to such apparatus used in operations utilizing heat sealing to form the bag closed bottoms.

In such bag manufacturing processes a supply of flattened tubular plastic film is fed, open end down, to a sealing-cutting station. At a preselected point, according to the bag length desired, a sealing-cutting operation is performed wherein a bag bottom is formed by pressing an arcuate shaped sealing element from edge to edge across the flattened tubular film against a back plate, and an adjacent arcuate cut is made to sever the just formed bag from the tubular film supply. The film sealing element can be one of the thermal or radio frequency types of sealing elements generally employed for sealing the specific plastic film being used. Further on in the process, one ply of the newly made flattened bag may be further arcuately cut to form an arc-mouthed lipped bag, wicket holes may be punched or otherwise formed in one or both of the bag plies, and the bags collected at an assembly point for collating, wicketing, and packaging. The tubular plastic film bag stock used in such manufacturing processes is thin, being in the order usually of one or two mils or less, slippery, limp, and somewhat difficult to handle. Since these bags are used in food packaging, it is important that they be produced free of defects and contamination and with physical and hygienic integrity. These criteria present some formidable problems in bag handling machine design. The bag manufacturing apparatus must be capable of firmly gripping and holding the slippery, limp, flexible two ply bag material during movement and the performance of processes steps without coincidentally straining, pinching, cutting or otherwise damaging the bag material. Particularly careful and delicate handling is required in the heat sealing-cutting step since the heat seal is soft and tacky for awhile after it is formed and is thus vulnerable to strain damage and to sticking onto whatever it may contact. Since both ends, that is the mouth and the bottom, are subjected to forming operations in the manufacturing process, it is also advantageous to leave these ends free by applying all gripping and holding at a point or points intermediate the bag ends.

In consideration of these criteria, desiderata and needs then, the present invention was conceived and developed to provide a bag handling technique useful in manufacturing flexible plastic film bags in a continuous production process.

The invention in particular provides an apparatus and method which is suited to bag manufacturing processes which involve heat sealing as part of the bag forming operation.

The invention further provides a bag handling technique which, with consistently reproducible results, handles and transports bags in the process of manufacture with a firm steady gripping hold without straining, punching, or otherwise detrimentally affecting the bag material. A still further and significant advantage is provided by the present invention in that it grips and holds the bags in process at a foldover line intermediate the bags ends, that is to say the bag bottom and the bag open mouth, thus leaving these bag ends free and accessible for the performance thereon of other process steps required in the manufacturing operation.

These and other advantages, features, and objects of the present invention will be the more readily understood from the ensuing detailed description and the drawings wherein;

FIG. 3 is an isometric free body view showing the relationship between bag gripper and bag foldover forming elements of apparatus according to the invention, and FIGS. 4, 5 and 6 are partially sectionalized elevational views showing the sequential steps of bag foldover forming and bag gripping with apparatus according to the invention.

Figure 1:
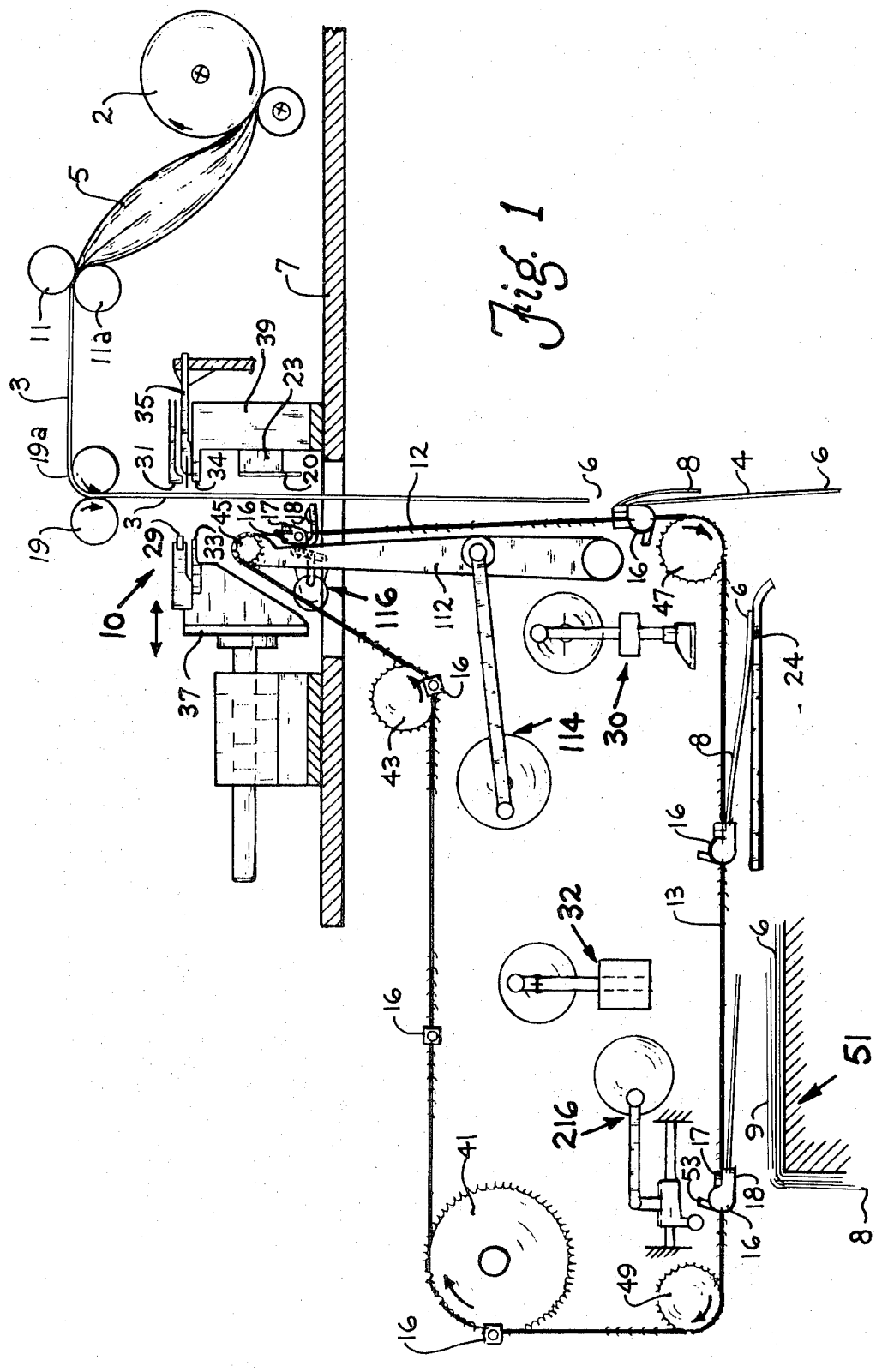
FIG. 1 is a schematic elevational view of bag manufacturing machinery including apparatus according to the present invention.

In its apparatus aspects, the present invention comprehends an apparatus for transporting flexible web material having a first end and a second end, from a first machine station to at least a second machine station, which comprises in combination, an endless conveyor having a first flight adjacent and juxtaposed to said first station and having a second flight adjacent and juxtaposed to said second station; web foldover forming means mounted adjacent said first station, arranged and disposed to coact with a web gripper means; web gripper means mounted on said conveyor, adapted to coact with said web foldover forming means while closing to a web gripping position to form a foldover transversely across said web at a preselected foldover locus between said first and second ends of said web, and to grip said web at said foldover while maintained closed in said gripping position; means for closing said web gripper means operably adjacent and juxtaposed to said web foldover forming means; means for maintaining said web gripper means closed on a folded over web during its movement with said conveyor from said first station to said second station; and means for opening said web gripper means operably adjacent and juxtaposed to said second station; whereby said web is folded over and gripped intermediate said web ends at said first station, is transported in folded gripped position to said second station, and is released at said second station.

In one preferred embodiment, the present invention comprehends apparatus for transporting a sealed bottom open mouthed flattened flexible plastic film bag, formed from a tubular film supply, from a bag bottom sealing-cutting station to a bag stacking station comprising, in combination, an endless conveyor having a substantially vertically disposed run adjacent and juxtaposed to the sealing-cutting station and a substantially horizontally disposed run adjacent and juxtaposed to the bag stacking station, bag foldover forming means fixedly mounted adjacent said sealing-cutting station arranged and disposed to coact with a bag gripper means, bag gripper means mounted on said conveyor adapted to coact with said bag foldover forming means while closing to a bag gripping position to form a foldover transversely across said bag at a preselected foldover line between the bottom and the mouth of said bag and to grip said bag at said foldover while maintained closed, means for closing said bag gripper means operably adjacent and juxtaposed to said bag foldover forming means, means for maintaining said bag gripper means closed on a folded over bag during its movement with said conveyor from the sealing-cutting station to the stacking station, and means for opening said bag gripper means operably adjacent and juxtaposed to bag stacking station whereby said bag, after having been formed in a bottom-sealing cutting operation, is folded over and gripped in the substantially vertically disposed run of the conveyor and released at the bag stacking station while being carried in the substantially horizontal run of the conveyor, and also to a method according to this technique.

The method of transporting limp flattened tubular film bags through successive, spaced stations in a machine in a manner permitting operational steps to be performed on both ends of the bag, may be described as comprising the steps of; providing a supply of flattened film plies in a substantially vertical plane, forming a foldover transversely across said film plies at a preselected locus between a mouth end and a bottom end of said bag when formed, gripping and supporting said folded-over film plies at said preselected locus, forming said bag bottom and severing the bag from said film supply while supported at said preselected locus, advancing said gripped folded-over bag to successive operating stations, and releasing straightening and depositing said gripped bag onto a flat stack of bags.

Figure 2:
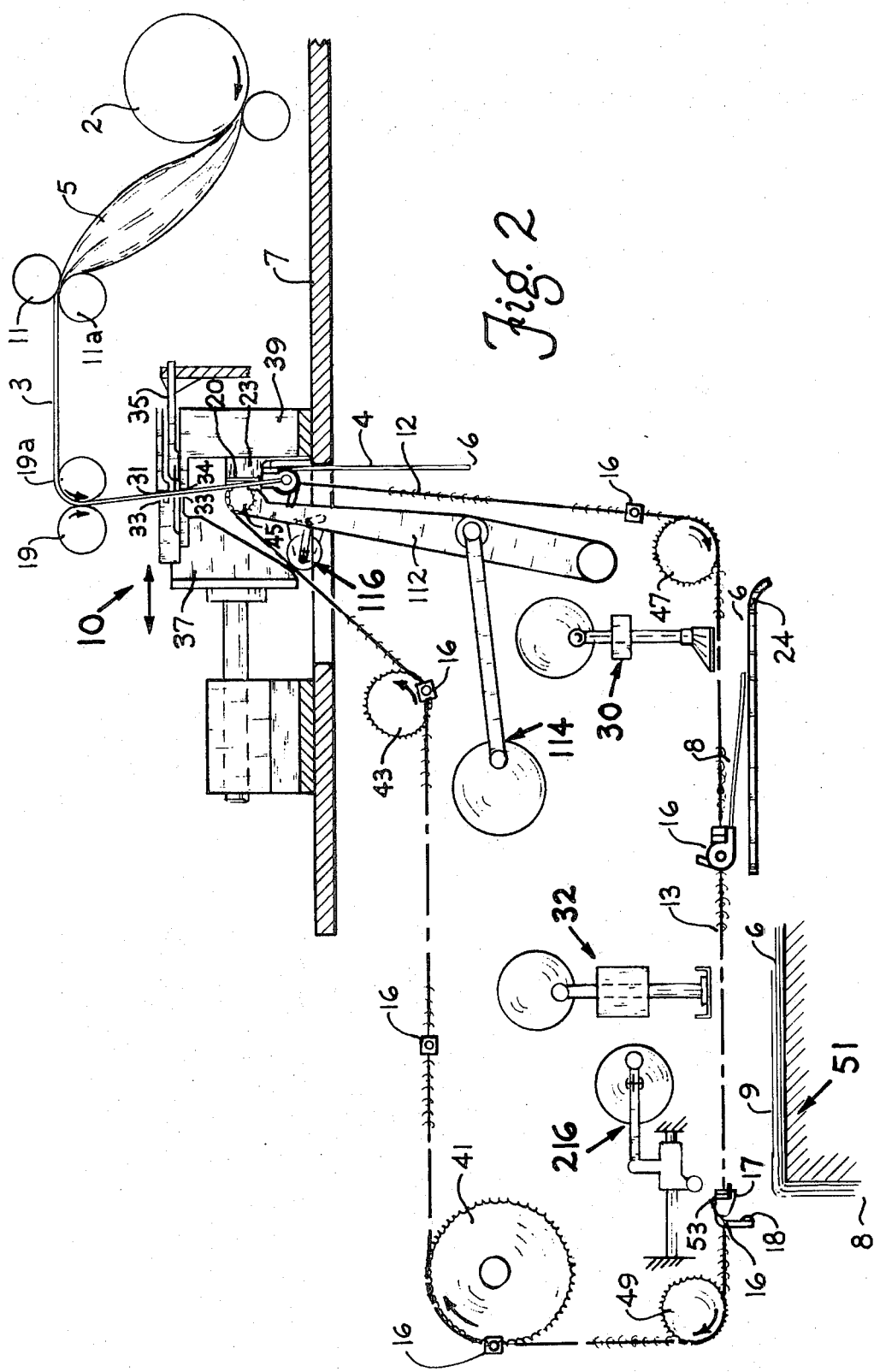
FIG. 2 shows the apparatus of FIG. 1 in a bag bottom sealing-cutting operation with the bag gripper mechanism folding and gripping a just finished bag for transport.

With reference to the drawings, FIGS. 1 and 2 show an arrangement of apparatus according to the present invention wherein a parent flattened tubular film supply roll 2 at the upper right feeds into an inflated tubing 5 zone where the film plies are separated from each other to insure free opening of the finished bags. The tubular film supply is passed through nip rolls 11, 11a to reform flattened plies 3 and directed downward through feed rolls 19, 19a to a bag bottom sealing-cutting station indicated generally at 10 with an open end 6 of a bag to be formed depending downward beneath the sealing-cutting station 10, which is not part of the invention. Sealing-cutting station 10, mounted on frame 7, comprises a film clamping element 29, and a heat-sealing element 33 mounted on a reciprocally moveable carriage 37 shown in its retracted position in FIG. 1 and in its sealing-cutting position in FIG. 2 whereby clamping element 29 and heat-sealing element 33 coact with film clamping element 31, the sealing back plate 34 fixedly mounted on stanchion 39, and a cutting blade 35 rotatably mounted on frame 7. The flattened plies 3 of the tubular film supply pass vertically as shown between the sealing-cutting elements and their respective juxtaposed clamping, and back plate elements mounted on stanchion 39, and cutting blade 35 mounted on frame 7.

A conveyor system subtends the sealing-cutting station 10 and comprises an endless chain pair, driven by a drive sprocket 41 and riding on guide sprockets 43, 45, 47, 49. A vertical flight 12 of the conveyor pair is shown running substantially parallel to the vertically depending film supply disposed on the sealing-cutting station 10 and a horizontal flight 13 of the conveyor pair is shown running substantially parallel to and above a bag stacking station 51 whereon finished bags 9 are stacked upon being dropped from the conveyor.

A bag guiding platen 24 is disposed in the path of the bag travel on the conveyor and serves to orient the bag to a horizontal disposition as it is moved around guide sprocket 47 from the vertical flight 12 to the horizontal flight 13.

The conveyor is provided with a multiplicity of clamping carriages 16 mounted athwart the chain pair and spaced at preselected substantially equal intervals thereabout. FIG. 3, in a free body or exploded view, shows a clamping carriage 16 in detail and illustrates how each carriage mounts a pair of bag grip pads 17 and pivotably moveable bag grippers 18. The bag grippers 18 include cams 53 aligned on a gripper mounting shaft 55. Springs 57 may be provided to bias the bag grippers 18 to a desired position, closed for instance, with respect to the grip pads 17.

Stanchion 39 mounts a bag folding blade 20 or an equivalent plate-like member, having a downwardly disposed castellated edge 21 defining castellations 22. The blade 20 is held away from the stanchion towards the vertically depending plies 3 of the film supply by a blade mounting pad 23. A second blade 20a with an edge 21a and castellations 22a may be provided on mounting pad 23 to accommodate a different bag gripping locus across the film plies or to accommodate a different bag length. FIG. 4 shows a blade 20 arrangement disposed in coacting relationship with a clamping carriage 16 assembly in open position and the flattened film plies 3 disposed between the clamping carriage and folding blade assemblies.

Figure 6:
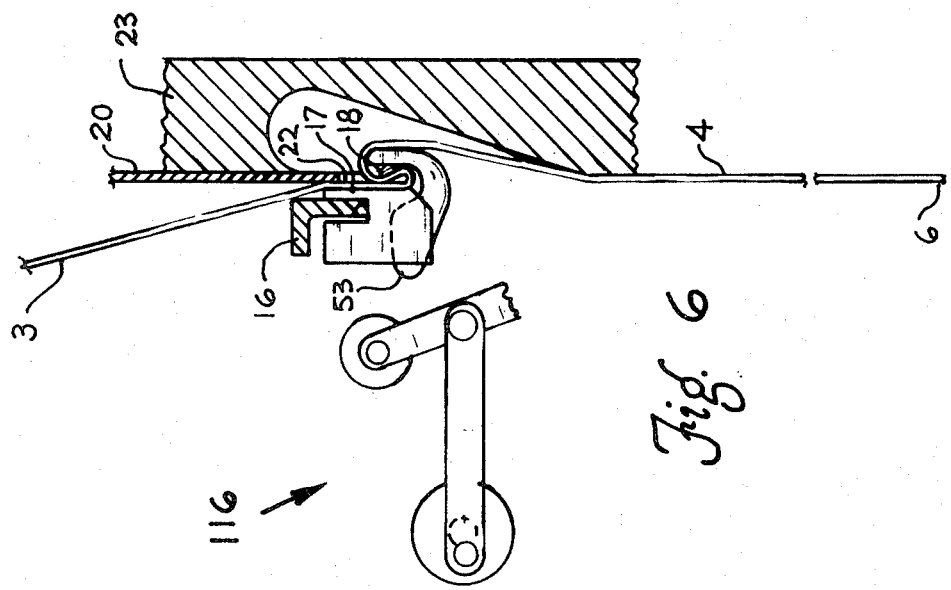
Figure 5:
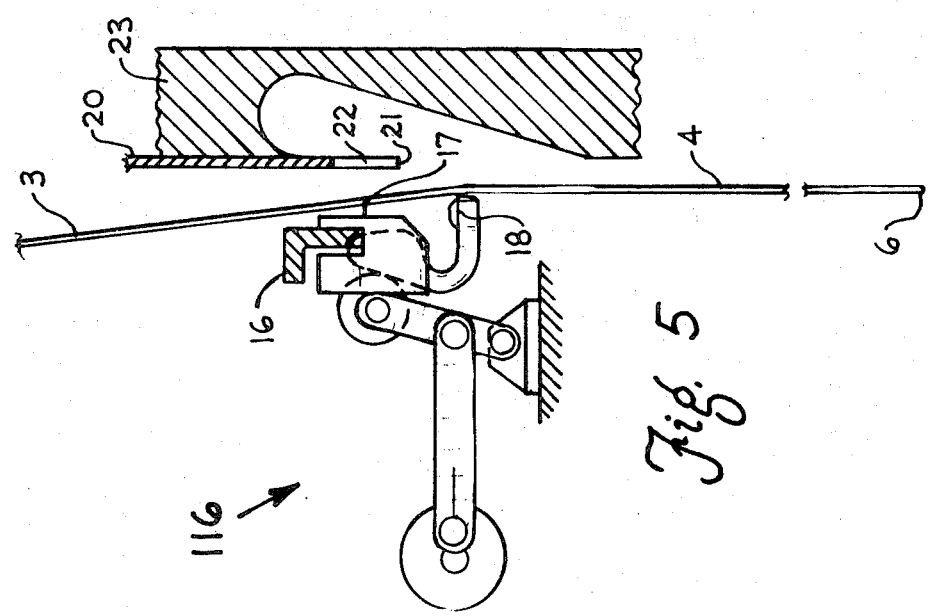

The conveyor guide sprocket 45 is rotatably mounted at the upper end of a pivotably moveable vertical conveyor flight advancing arm 112 which is indexed into and out of an advanced position by a linkage 114 assembly as shown in FIGS. 1 and 2. Operation of the linkage 114 and the arm 112 permits selectably advancing the conveyor vertical flight 12 and the indexed clamping carriage 16 towards the vertically depending flattened plies 3 of the tubular film supply as shown partly advanced in FIG. 5, and fully advanced to pressingly engage the film plies 3 between grip pads 17 and blade 20 as shown in FIG. 6. A bag gripper cam actuating assembly 116 is provided to selectably effect contact with cams 53 of the bag grippers 18 and trip the grippers 18 closed, folding the bag plies 3 under and about the blade edges 21. The widths of grippers 18 are narrower than the castellations 22 in blade 20 and are juxtaposed therewith to allow grippers 18 when tripped, to clamp the folded over bag plies 3 through the castellations to firmly hold the folded bag onto grip pads 17. This action is operably coordinated with the advance of the moveable sealing carriage 37 into the sealing-cutting step position shown in FIG. 2. A bag gripper cam actuating assembly 216 is provided to selectably effect contact with cams 53 of the bag grippers 18 and trip the grippers open to release each bag in sequence onto the bag stack 9 at the stacking station 51.

The vertical conveyor flight advancing arm 112, is maintained in its advanced position as the sealing-cutting operation is performed at station 10; during a dwell period when the bag bottom seal 8 is allowed to cool; and also during the initial movement of the conveyor chain pair advancing the gripped bags 4 to succeeding operating stations 30, 32. As soon as the initial downward movement of the vertical flight 12 of the conveyor pair strips the folded over bag from the blade edges 21, the flight advancing arm 112 is retracted to the position shown in FIG. 1.

The apparatus described above is operated by a conventional power drive connected to a master cam and gear train (not shown) which are adapted to intermittently sequence the flattened film supply 2 to and through feed rolls 19, 19a to the cutting-sealing station 10 where a bag is made and severed from the tubular film supply. Coacting with the cutting-sealing operation is the foldover forming and bag gripping means 112, 116 whereby the successively formed and folded over bags are gripped and are thence indexed from the vertical depending disposition to the horizontal disposition shown at bag lip forming station 30; thence to a bag wicketing means 32 and to the finished bag stacking station 51. The master cam train also serves to actuate auxiliary electrical and pneumatic circuits (not shown) for selectively timed operation of the apparatus elements described above.

Exemplary of production obtained with the apparatus of the invention, bags have been made of tubular polyvinylidene chloride film of from about 0.08 mm. to 0.11 mm. wall thickness, with a flat width of from about 10 cm. to 40 cm., and of a length from about 25 cm. to 90 cm.

In the embodiment described above, the gripper-transfer apparatus of the invention is part of a plastic bag manufacturing machine wherein the bag transport conveyor comprises a first flight vertically disposed to handle flexible tubular plastic film in a vertically depending manner and has a second flight horizontally disposed to handle unit bags of said film and drape them horizontally flat for stacking onto a file. The present invention will work equally well with a variety of web materials when the first flight of the conveyor is horizontally disposed. The gripper-transfer apparatus of the invention can also be readily adapted to grip and transport a continuous flexible web in a manner whereby it is supported between gripping members. The present invention will work equally well with single ply or multiple ply web materials such as plastics, papers and fabrics of narrow and wide widths. It is particularly useful in processes using thin, slippery, limp and difficult to handle materials and is readily adaptable to bag making, printing, folding, drying, dyeing operations, and the like.

Thus the present invention provides solutions to a number of problems inherent in the handling of limp flexible web materials and makes for a significant advance in the art. Alternative embodiments and modes of practicing the invention, but within its spirit and scope, will, in the light of this disclosure, occur to persons conversant with the film and web handling arts. It is intened therefore that this description be taken as illustrative only and not construed in any limiting sense.

What is claimed is:

1. Apparatus for transporting a flexible web material having a first end and a second end, from a first machine station to at least a second machine station, which comprises in combination:

an endless conveyor having a first flight adjacent and juxtaposed to said first station and having a second flight adjacent and juxtaposed to said second station;

web foldover forming means mounted adjacent said first station, arranged and disposed to coact with a web gripper means said web foldover forming means comprising a plate-like member having a castellated edge;

web gripper means mounted on said conveyor adapted to coact with the castellated edge plate-like member of said web foldover forming means while closing to a web gripping position to form a foldover transversely across said web at a preselected foldover locus between said first and second ends of said web, to grip the folded over web through the castellation in the edge of the plate-like member of the foldover forming means, and to continue to grip said web at said foldover while maintained closed in said gripping position;

means for closing said web gripper means operably adjacent and juxtaposed to said web foldover forming means;

means for maintaining said web gripper means closed on a folded over web during its movement with said conveyor from said first station to said second station; and means for opening said web gripper means operably adjacent and juxtaposed to said second station, whereby said web is folded over and gripped intermediate said webs ends at said first station, is transported in folded gripped position to said second station, and is released at said second station.

2. Apparatus of claim 1 wherein said first flight is vertically disposed.

3. Apparatus for transporting a sealed bottom open mouthed flattened flexible plastic film bag, formed from a tubular film supply, from a bag bottom sealing-cutting station to a bag stacking station comprising, in combination:

an endless conveyor having a substantially vertically disposed run adjacent and juxtaposed to the sealing-cutting station and a substantially horizontally disposed run adjacent and juxtaposed to the bag stacking station;

bag foldover forming means mounted adjacent said sealing-cutting station arranged and disposed to coact with a bag gripper means said bag foldover forming means comprising a plate-like member having a castellated edge;

bag gripper means mounted on said conveyor adapted to coact with the castellated edge plate-like member of said bag foldover forming means while closing to a bag gripping position to form a foldover transversely across said bag at a preselected foldover line between the bottom and the mouth of said bag, to grip the folded over bag through the castellation in the edge of the plate-like member of the foldover forming means and to continue to grip said bag at said foldover while maintained closed;

means for closing said bag gripper means operable adjacent and juxtaposed to said bag foldover forming means;

means for maintaining said bag gripper means closed on a folded over bag during its movement with said conveyor from the sealing-cutting station to the stacking station; and, means for opening said bag gripper means operably adjacent and juxtaposed to said bag stacking station, whereby said bag, after being formed in a bottom-sealing cutting operation, is folded over and gripped in the substantially vertically disposed run of the conveyor and released at the bag stacking station while being carrier in the substantially horizontal run of the conveyor.

4. An improved method of transporting a ply of flexible web material having a first end and a second end, from the first machine station to at least a second machine station, in a manner sufficient to permit operational steps to be performed on said ply ends at machine stations intermediate said first and second stations, which comprises the steps of:

passing said ply to said first station; folding said ply over a castellated edged plate at said first station along a locus between said first and second ends; gripping said folded ply through castellations in a plate overfolded by the ply; and,
advancing said gripped folded ply to said second station.

* * * * *